United States Patent [19]
Breazeale et al.

[11] 3,771,829
[45] Nov. 13, 1973

[54] DUMP TRAILER

[75] Inventors: Russell E. Breazeale, Seattle; Tyman H. Fikse, Enumclaw, both of Wash.

[73] Assignee: Truckweld Equipment Co., Seattle, Wash.

[22] Filed: Feb. 22, 1972

[21] Appl. No.: 227,785

[52] U.S. Cl. .......... 298/17 R, 298/22 R, 280/106 T
[51] Int. Cl. ......................... B60p 1/16, B62d 63/06
[58] Field of Search ...................... 298/8 R, 8 T, 5, 298/22 R; 280/106 T, 104.5

[56] References Cited
UNITED STATES PATENTS

| | | | |
|---|---|---|---|
| 2,853,309 | 9/1958 | Hubbard | 280/106 T |
| 2,924,347 | 2/1960 | Scott | 298/5 X |
| 3,082,039 | 3/1963 | Clement | 298/8 X |
| 3,193,330 | 7/1965 | Hribar | 298/8 R |
| 3,458,214 | 7/1969 | West | 280/104.5 R |

FOREIGN PATENTS OR APPLICATIONS

| | | | |
|---|---|---|---|
| 768,379 | 2/1957 | Great Britain | 280/106 T |
| 1,122,388 | 5/1956 | France | 298/5 |

*Primary Examiner*—Richard J. Johnson
*Attorney*—Robert W. Beach

[57] ABSTRACT

Two straight rails converging forwardly to an apex are connected at spaced locations by cross members to form a frame. Dual axles support opposite ends of rockers mounting the rear portion of the frame. A trailer hitch secured on the top of the frame apex, when connected to a truck, trims the frame in forwardly and downwardly sloping attitude. Rearwardly and downwardly tapered sills mounted on the bottom of a dump body converge forwardly corresponding to the convergence of the frame rails for supporting the dump body in level position when it is lowered.

7 Claims, 6 Drawing Figures

PATENTED NOV 13 1973 3,771,829

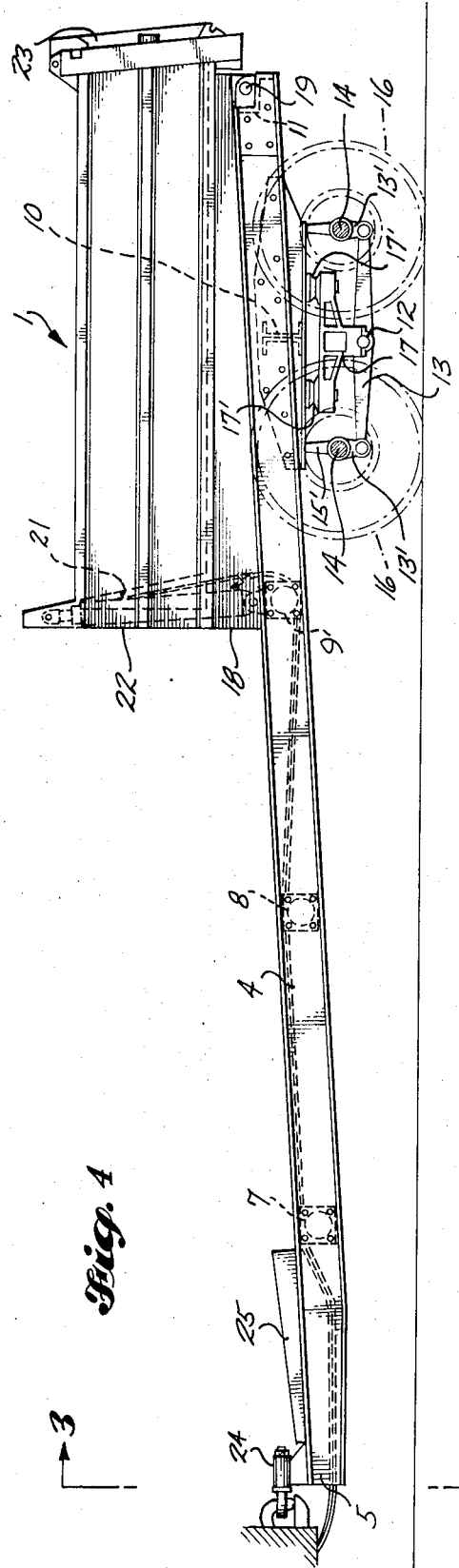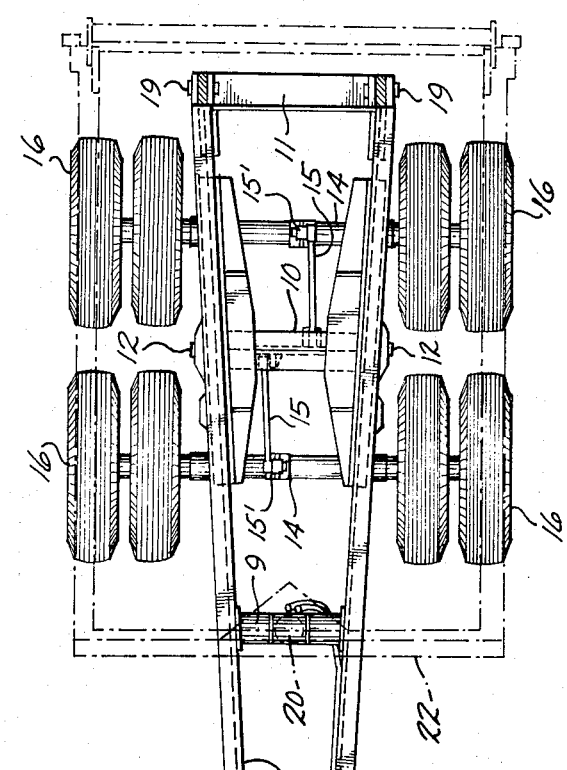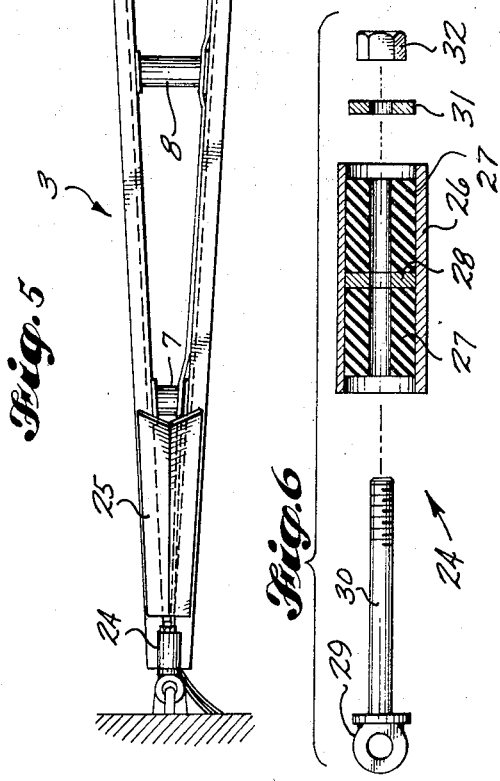

DUMP TRAILER

The trailer construction of the present invention is intended primarily for dump trailers but can be utilized to advantage for trailers of other types.

A principal object of the present invention is to provide a trailer frame construction which is structurally efficient and avoids stress concentration locations, and, consequently, is strong and light.

In addition, it is an object to provide such a trailer frame which is of rugged construction, being of triangular configuration, both to provide rigidity and to correlate resistance of the structure to deformation with stresses to which the trailer frame may be subjected.

Another object is to provide a trailer frame structure which is economical to fabricate, being composed principally of straight stock material which requires no forming and which can be assembled quickly and easily.

A further object is to provide a trailer construction which can be maneuvered easily and on which the load will be supported effectively.

FIG. 4 is a side elevation of the frame and body of such a trailer;

FIG. 5 is a top plan of the trailer chassis;

FIG. 6 is an exploded detail elevation of the trailer hitch, parts being shown in section.

Figure 1:
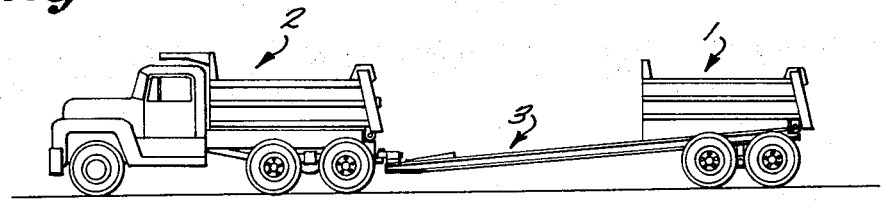
FIG. 1 is a side elevation of a trailer in accordance with the present invention shown connected to a truck.
Figure 2:
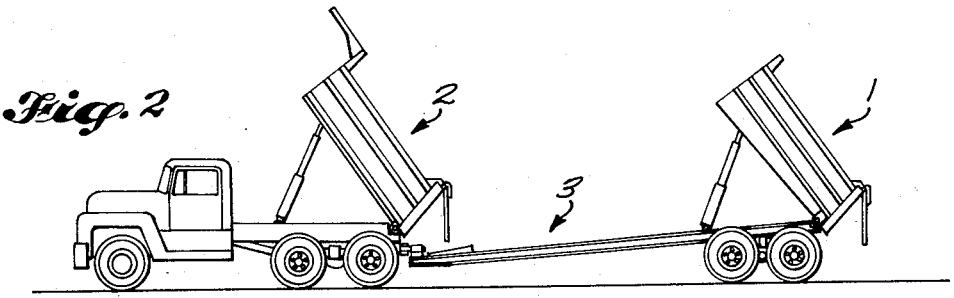
FIG. 2 is a similar view showing the truck and trailer with the dump bodies of both vehicles in dumping position.

A desirable embodiment of the present invention is in the form of a dump trailer 1 which can be pulled by a dump truck 2 in the manner shown in FIG. 1. Moreover, the dump body of the trailer 1 and the dump body of the truck 2 can both be dumped while the trailer is hitched to the truck, as shown in FIG. 2.

Figure 3:
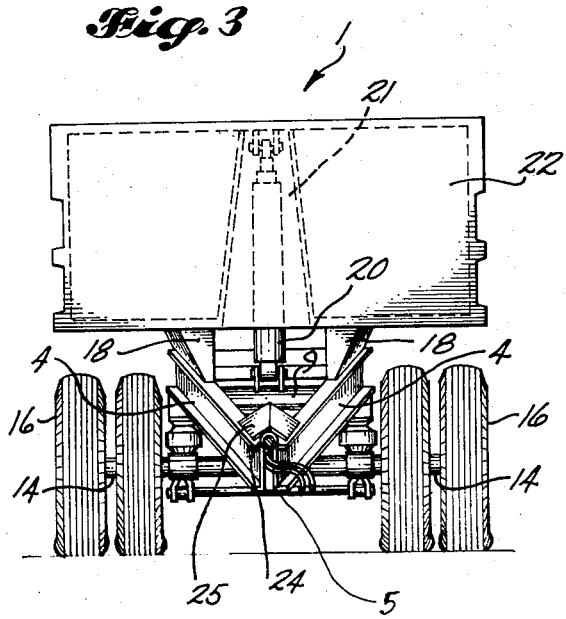
FIG. 3 is a front elevation of a trailer according to the present invention.

A principal characteristic of the present invention is the construction of the frame 3 of the trailer. As shown in FIGS. 3 and 5, the frame includes long straight side rails 4 converging forwardly to an apex 5. Such rails may be of channel-shaped cross section, shown as being arranged with their flanges projecting outwardly but the rails could be disposed with their flanges projecting inwardly. The forward ends of the webs of the two rails can be secured together by bolts or other fasteners 6 or by welding. Fillers or spacers may be placed between the webs of the rails 4 at the apex of the frame or plates may be welded to the flanges of the rails for spacing the apex ends of the rails apart sufficiently to provide a tunnel for passage of air hoses, hydraulic hoses and electric wires.

At locations preferably spaced approximately equidistantly rearward of the apex 5, the rails 4 are connected together in their forwardly convergent spaced relationship by cross members 7, 8, 9, 10 and 11. The forward cross members 7, 8, and 9 preferably are tubes which constitute a structurally efficient type of member. The opposite ends of such tubes may carry inclined flanges that can be bolted or welded to the rails 4. The cross member 10 is formed by twin channels mounted back-to-back, as indicated in broken lines in FIG. 4. The rear cross member 11 may be of angle or Z-shaped cross section.

Because the side rails 3 are straight, both in plan, as shown in FIG. 5, and in elevation, as shown in FIG. 4, there are no stress concentration locations such as are caused by bends. Moreover, the resulting frame structure is triangular, which is very rigid. The resistance of the structure to lateral bending stresses increases with the width and the bending stresses in the frame produced by a side thrust on its apex 5 are directly proportional to the distance from such apex. Consequently, the forward portion of the frame 3 constitutes a very rugged tongue.

The trailer frame is mounted on a trunnion shaft 12, the opposite ends of which are supported on walking beams 13 connected to the lower ends of horns 13' on front and rear axles 14. Upper links 15 connect the cross member 10 to horns 15' projecting upward from axles 14. The opposite ends of axles 14 are supported by pairs of dual wheels 16. A shock absorbing bar 17 is secured to each walking beam and has rubber end cushions 17' to cushion rocking of such beam. The front and rear axles 14 can therefore be displaced elevationally relative to each other without exerting a torque on the shaft 12.

In order to avoid exerting excessive loads on the truck 2, the body of the trailer preferably is substantially centered over the trunnion shaft 12. Such body may be any conventional dump body. When its floor is level, as shown in FIGS. 1, 3 and 4, the rails 4 of the frame 3 will slope downwardly and forwardly relative to the body bottom. Such downward and forward slope of the rails locates their forward ends close to the ground. Also, as shown in FIG. 5, the rails 4 converge forwardly from the rear end of the frame between the opposite wheels of the trailer chassis.

For supporting the trailer dump body from the frame 3, sills 18 are provided on the bottom of the dump body extending fore and aft. In order to provide a distributed bearing area on the bottom of the dump body while applying the load of the body most effectively to the rails 4 of the frame 3, it is preferred that the sills 18 taper downwardly, as shown in FIGS. 3 and 4. Also, to distribute the load of the body uniformly along the lengths of the frame rails, the sills 18 are tapered rearwardly, as shown in FIG. 4, to a degree corresponding to the forward and downward slope of the frame 3.

The rear portion of the dump body is mounted on pivots 19 carried by cross member 11 about which the dump body can be tilted by a fluid-pressure jack 20 connected between the trailer frame and the forward end of the dump body. Such fluid-pressure jack is received in a well 21 in the front wall 22 of the dump body, as indicated in FIGS. 3 and 4. As the trailer body is tilted into dumping position, the tailgate 23 will swing open, as shown in FIG. 2. Such dump body and the mechanism for dumping it may be conventional.

As also indicated in FIG. 2, the body of the truck 2 can be tilted to dump its load while the trailer hitch 24 is connecting the apex 5 of the trailer frame to the truck. It is practical to effect such dumping operation of the truck while the trailer is connected because the tongue formed by the forward portion of the trailer frame in longitudinal registration with the dumping truck body is quite narrow. In addition, a saddle back 25 may be mounted on the forward portion of the trailer frame to cause any material falling onto the forward portion of the trailer frame to be sloughed off, since both the dump body of the truck and the dump body of the trailer can be caused to dump by manipulation of controls in the cab of the truck. It is therefore possible for the loaded truck and trailer to be unloaded by the truck driver without leaving the truck cab.

Because the frame 3 of the trailer slopes downwardly and forwardly to the degree indicated in FIGS. 2 and 4, the rear portion of the frame can be located above the axles 14 and 15 and the forward portion of the frame can be sufficiently low so that the tailgate of the truck dump body will clear it when such dump body is dumping, as shown in FIG. 2, without the necessity of providing any bend or offset in the frame rails 4. Moreover, the forwardly convergent relationship of the rails 4 provides maximum lateral stability for support of the trailer dump body, while affording adequate strength for the tongue portion of the frame, again without requiring any offset or bend in the rails 4.

The dump body of the trailer extends transversely above the wheels 16, and the sills 18 are of a depth sufficient to provide adequate clearance between the bottom of the dump body and the wheels. In order to enable the rails 4 of the frame to be straight elevationally, as shown in FIG. 4, without being inclined execssively, it is preferred that the tongue portion of the frame forward of the dump body exceed in length the portion of the frame beneath the dump body. In FIG. 4, the tongue portion of the frame forward of the dump body is shown as being approximately 50 percent longer than the portion of the frame beneath the dump body.

A frame of the type shown in FIGS. 4 and 5 can be constructed economically because the rails 4 and cross member 10 can be made of standard structural channels and need only be cut to length and assembled. No forming operation of any kind is required. The cross members 7, 8 and 9 can be formed economically simply by cutting them from tubing and welding on their attaching flanges. Moreover, the side rails can be assembled with each other economically by joining their forward ends and connecting the cross members at appropriate locations to the webs of the rails by welding.

The cross shaft 12 can be carried by suitable hangers attached to the cross member 10 or to the rails 4. The axles 14 and wheels 16 can be conventional. The sills 18 having a trapezoidal cross section can be fabricated from plate material by welding and then welded to the bottom of a conventional dump body.

An advantage of the present trailer construction is that the frame is mounted on a three-point rubber suspension. The rubber mounts of the shock-absorbing bars 17 at opposite sides of the trailer frame under the body have been mentioned above. The trailer hitch 24 is constructed to provide the third rubber mount. The details of the trailer hitch construction are shown in FIG. 6.

Such trailer hitch includes a tube 26 secured to the apex 5 of the frame. Rubber bushings 27 are fitted or bonded in such tube at opposite sides of an apertured partition 28 secured in the central portion of the tube. The trailer is hauled by an eye 29 on the end of shank 30 of an eyebolt. Such shank is of a size to extend through the bushings 27 and aperture of the partition 28. The eyebolt shank is secured within the tube by a washer 31 and nut 32 screwed on the shank. Reciprocation of the eyebolt relative to the tube 26 will be cushioned by the bushings 27.

We claim:

1. A trailer chassis comprising a frame including two substantially straight rails converging forwardly from adjacent the rear portion of the trailer, wheel means supporting the rear portion of said frame, trailer hitch means carried by the forward portion of said frame for connection to a towing vehicle, a dump body carried by the rear portion of said frame, and sills extending longitudinally of the trailer chassis, projecting downward from the bottom of said dump body and converging forwardly in registration with the respective corresponding portions of said rails beneath said dump body.

2. The combination defined in claim 1, in which the sills are tapered downwardly and their lower edges are adapted to rest on the upper edges of the rails.

3. The combination defined in claim 1, in which the trailer frame slopes forwardly and downwardly from the dump body when the lower edges of the sills engage the upper edges of the respective rails.

4. The combination defined in claim 3, in which the sills are tapered rearwardly in height.

5. A trailer comprising a dump body, a frame including two continuous straight rails of a length more than twice the length of said body and located beneath said body, spacer means connecting said rails in a relationship converging forwardly and sloping downward from substantially the rear end of said body, wheel means directly supporting the rear portions of said rails independently of said body, horizontal pivot means mounting the rear end of said body on the rear portions of said rails, means for supporting the front portion of said body from said rails, and trailer hitch means carried by the forward portion of said rails for connection to a towing vehicle.

6. The trailer chassis defined in claim 5, a shaft having its length extending transversely of the rear portions of the rails and connected to them substantially midway between the front end and the back end of the body, and rocker means mounted on opposite ends of said shaft and supporters by the wheel means.

7. The trailer chassis defined in claim 5, and saddleback means mounted on the front portion of the frame for shedding from the frame particulate material dropped on said saddleback means.

* * * * *

PO-1050
(5/69)

UNITED STATES PATENT OFFICE
CERTIFICATE OF CORRECTION

Patent No. __3,771,829__    Dated __November 13, 1973__

Inventor(s) __Russell E. Breazeale and Tyman H. Fikse__

It is certified that error appears in the above-identified patent and that said Letters Patent are hereby corrected as shown below:

Column 4, line 12, cancel "chassis"; line 19, cancel "chassis"; line 23, cancel "combination" and insert --trailer--; line 26, cancel "combination" and insert --trailer--; line 27, cancel "trailer"; line 30, cancel "combination" and insert --trailer--; line 40, cancel "end" and insert --portion--; line 45, cancel "chassis"; line 47, cancel "them" and insert --said rails--; line 50, cancel "supporters" and insert --supported--; line 51, cancel "chassis".

Signed and sealed this 23rd day of April 1974.

(SEAL)
Attest:

EDWARD M. FLETCHER, JR.
Attesting Officer

C. MARSHALL DANN
Commissioner of Patents